United States Patent [19]

Vasku

[11] Patent Number: 4,651,430
[45] Date of Patent: Mar. 24, 1987

[54] SNAP GAGE

[76] Inventor: George O. Vasku, 4925 Pelletier Rd., Orchard Lake, Mich. 48033

[21] Appl. No.: 810,560

[22] Filed: Dec. 19, 1985

[51] Int. Cl.[4] ............................................. G01B 5/08
[52] U.S. Cl. ............................. 33/178 D; 33/147 H; 33/178 R; 33/550
[58] Field of Search ............ 33/147 H, 147 R, 148 R, 33/148 E, 148 F, 149 K, 178 R, 178 D, 550, 143 R, 143 F, 149 J

[56] References Cited

U.S. PATENT DOCUMENTS

| | | | |
|---|---|---|---|
| 2,622,331 | 12/1952 | Haines | 33/143 R |
| 3,609,870 | 10/1971 | Johnson et al. | 33/178 R |
| 3,940,856 | 3/1976 | Meyer, Jr. | 33/178 R |
| 4,035,922 | 7/1977 | von Voros | 33/143 L |
| 4,170,831 | 10/1979 | Olasz | 33/178 R |
| 4,315,372 | 2/1982 | Kinkead | 33/148 F |
| 4,419,829 | 12/1983 | Miller | 33/178 R |
| 4,434,557 | 3/1984 | Meyer, Jr. | 33/148 R |

Primary Examiner—Willis Little
Attorney, Agent, or Firm—Cullen, Sloman, Cantor, Grauer, Scott & Rutherford

[57] ABSTRACT

The present invention relates to a snap gage that compensates for any misalignment of a part which is to be measured. The gage has two opposed, independently pivotal levers between which a part may be positioned. The levers pivot according to the dimensions of the part with the resultant overall pivotal movement of the levers being realized at a ball contact that operates a linear plunger connected to a linear movement indicator. The levers are substantially L-shaped having a sensing arm and a translating arm which contacts the linear plunger. The ends of the translating arms are each chamfered with one having a flat surface and the other having a non-flat surface, such as a radial or V-notched surface to maintain alignment of the plunger.

8 Claims, 6 Drawing Figures

SNAP GAGE

BACKGROUND OF THE INVENTION

The present invention relates to a snap gage and more particularly, a snap gage having independent levers that compensate for misalignment of a part to be measured.

Generally, snap gages are used to measure the external dimensions of a part and to determine the amount of deviation from a standard dimension. Typically, they employ either mechanical, electrical, or fluidic amplification techniques so that very small linear deviations can be detected.

One problem with these gages is the care that must be exercised when aligning a part in the gage. If the part is misaligned, the reading obtained from the indicator will be incorrect. As an example, a typical snap gage contacts opposite sides of a part. If the part is offset to one side within the gage, the gage will inaccurately indicate that the part is not within permissible tolerances. When a large number of parts must be gaged, the possibility of misalignment increases.

BRIEF SUMMARY OF THE INVENTION

The present invention overcomes the above disadvantages by providing a snap gage that compensates for misalignment. The gage has two opposed independently pivotal levers between which a part may be positioned. The levers pivot according to the dimensions and position of the part with the resultant overall pivotal movement of the levers being realized at a ball contact that operates a linear plunger connected to a linear movement indicator.

In the preferred embodiment, the levers are balanced by opposed biasing means; the first biasing means operates through the plunger biasing the levers away from the part while the second biasing means, individual springs, bias the levers toward the part. Due to the levers being independently pivoted and balanced, if the part is misaligned, one of the levers will pivot away from the part more than the other with the other lever being urged toward the part an equal amount. The individual pivotal movements are detected by the contact as a single, resultant movement which provides an accurate measurement, regardless of the alignment of the part.

A further feature of this invention is the configuration of the levers at the ball contact. Both levers have a diagonal end that slopes downwardly away from the ball contact. One lever's end is flat, providing line contact with the ball while the other lever's end is either V-shaped or radial along the length of the diagonal providing greater surface contact with the ball contact. This provides accurate alignment of the levers on the contact and makes assembly easier.

DETAILED DESCRIPTION OF THE INVENTION

Figure 1:
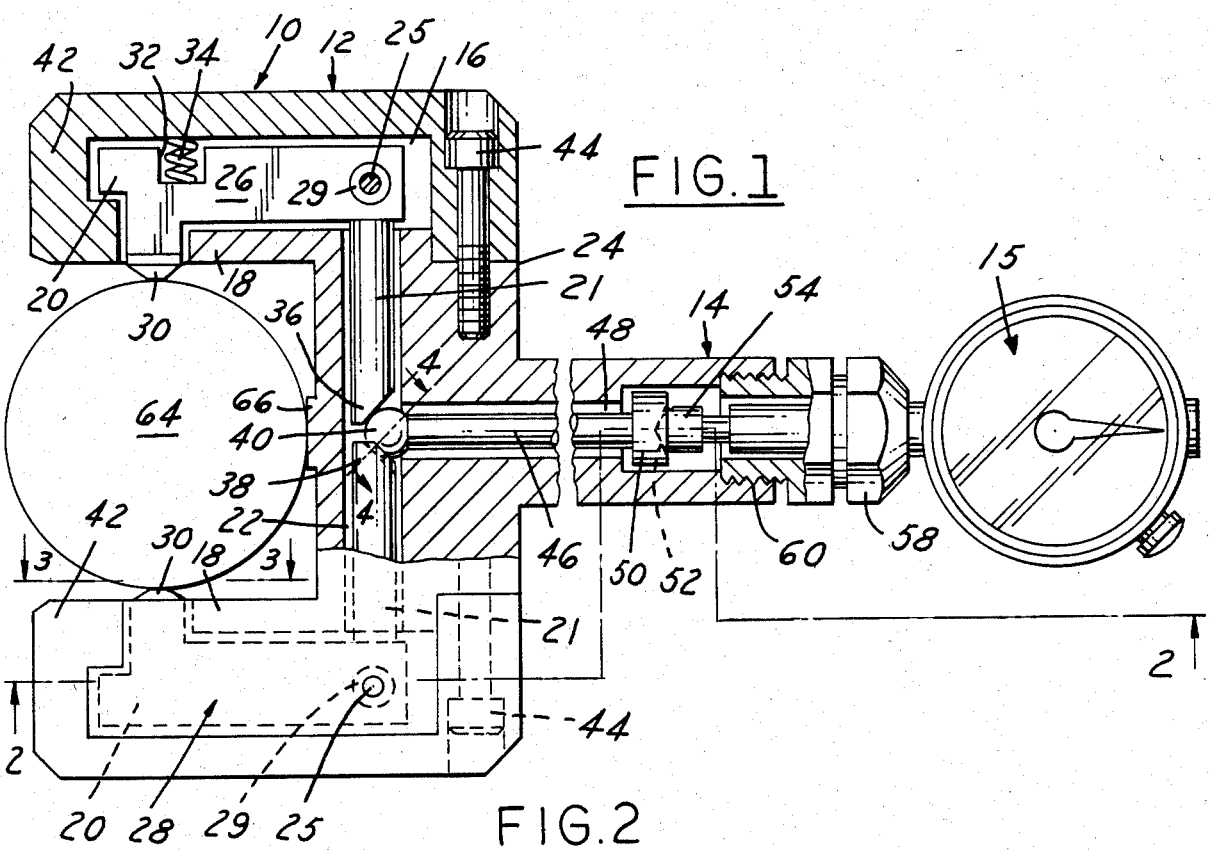
FIG. 1 is a partial cutaway plan view of the snap gage of the present invention.
Figure 2:
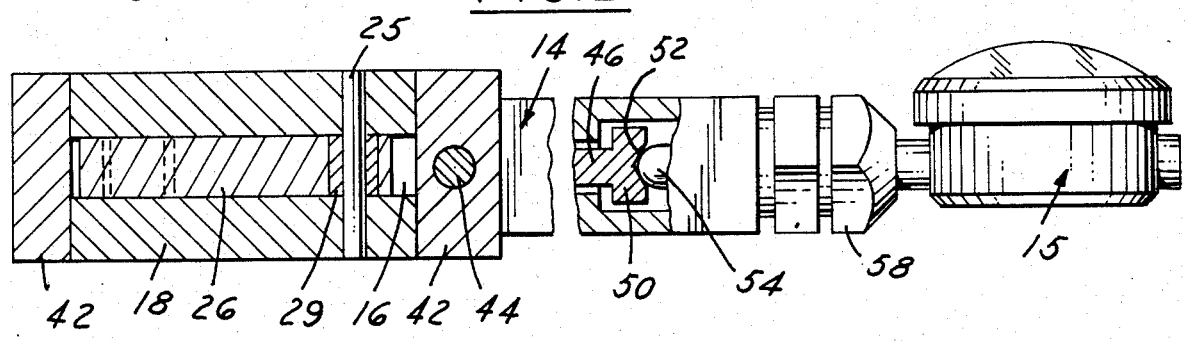
FIG. 2 is a cutaway view of FIG. 1 taken along line 2—2.

With reference to FIG. 1, the snap gage of the present invention is shown generally at 10 having a substantially U-shaped head 12 and a handle 14. A conventional dial indicator 15 is removably attached to the end of handle 14.

Head 12 has first and second legs 18 and a base 24. A longitudinally extending slot 16 is formed in each leg and a bore 22 is formed in base 24 interconnecting slots 16.

First and second opposed levers 26 and 28 are pivotally received within slots 16 and bore 22. Levers 26 and 28 are substantially L-shaped having a sensing arm 20 that extends longitudinally within slot 16 ending in a contact point 30 that extends within the interior of U-shaped head 12 and a perpendicular transfer arm 21 that extends longitudinally within bore 22. An opening is formed at the juncture of transfer arms 20 and 21 for receipt of a bushing 29 and pivot or pivot shaft 25 to permit independent pivotal movement of each lever 26 and 28. A recess 32 is positioned behind contacts 30 for receipt of a spring 34 to bias levers 26 and 28 inwardly so that contact point 30 is continually forced into the interior region of head 12. The pivots 25 have parallel axes, as shown in FIG. 1, which occupy a plane which extends through the transfer arms 20 and 21.

Figures 3, 4, 5:
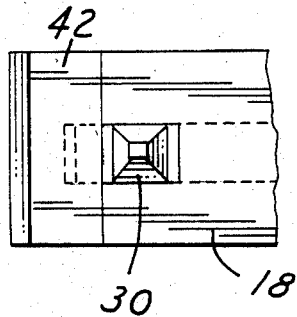
FIG. 3 is a partial view of FIG. 1 taken along line 3—3.
FIG. 4 is a partial view of FIG. 1 taken along line 4—4.
FIG. 5 is a modified embodiment of FIG. 4.

Transfer arms 21 of each lever 26 and 28 have chamfered distal ends 36 and 38 respectively that slant downwardly away from a ball contact 40. The plane containing the pivots 25 also extend through the distal ends 36 and 38 and the ball contact 40. In the preferred embodiment, contact 40 is made of tungsten carbide or hardened steel to resist wear. Distal end 36 of lever 26 has a flat surface which provides line contact with ball 40. Distal end 38, on the other hand, has either a radial seat 39, as shown in FIG. 4, or a V-shaped seat 41, as shown in FIG. 5. Both configurations of distal end 38 provide greater than line-to-line contact and facilitate proper operation of contact 40 and dial indicator 15 in a manner which will be discussed more fully below. Further, it is within the intended scope of this invention to not limit the configuration of distal end 38 to either a radial or V-shaped seat, but to include other configurations such as for example a rectangular shaped seat.

To protect levers 26 and 28 from damage and to ensure the accuracy of the snap gage 10, a guard 42 is provided to completely cover the exterior portion of levers 26 and 28. In the preferred embodiment, the guard is made of brass, bronze, nylon or similar durable materials and is held in place by machine screws 44.

Positioned directly below contact 40 is a plunger 46 that reciprocates within a bore 48 and biases contact 40 against levers 26, 28. The biasing means is provided by indicator 15 and is conventional and well known in the art. A collar 50 with a conical seat 52 is formed on the end of plunger 46 opposite contact 40 for receipt of a gaging spindle 54. Conical seat 52 is movable with respect to spindle 54 and contact 40 is movable with respect to distal ends 36 and 38, allowing plunger 46 to move laterally in addition to reciprocally in response to independent movement of levers 26 and 28. As should be apparent, as levers 26 and 28 are pivoted, their pivotal movement about shaft 25 is communicated to plunger 46 through transfer arms 21 and is detected by indicator 15 through gaging spindle 54. Indicator 15 is removably attached to handle 14 by a coupling unit 58 having exterior threads which correspond to interior threads 60 in handle 14.

In operation, a snap gage in accordance with the present invention is selected for a particular part 64. The part 64 is positioned between legs 18 of head 12 until it contacts stop member 66. Contact points 30 contact the exterior of part 64 irrespective of the part's position due to levers 26 and 28 being independently pivoted about shaft 25 and due to the biasing of springs 34.

Assuming part 64 is not offset, levers 26 and 28 will generally be forced away from part 64, raising distal ends 36 and 38, allowing plunger 46 and contact 40 to move upwardly along the diagonals of distal ends 36 and 38. The movement of plunger 46 is indicated by indicator 15.

Now assume that part 64 is offset within legs 18 and is positioned closer to lever 26. In this position, lever 26 will be forced away from part 64 against the bias of spring 34. Lever 28, however, will be biased by spring 34 toward part 64. The distal end 36 of lever 26 will be raised while the distal end 38 of lever 28 will be lowered with the resultant movement being detected by plunger 46 which moves laterally and reciprocally to compensate for the different positions of distal ends 36 and 38. The overall linear movement of plunger 46 is the sum of movements of levers 26 and 28. Since indicator 15 only responds to linear movement of plunger 46, which is the resultant movement of levers 26 and 28, an accurate measurement of part 64 is obtained.

In the preferred embodiment, the chamfered distal ends 36 and 38 of transfer arms 21 are slanted downwardly and away from contact 40 to permit reciprocal and lateral movement of plunger 46. As indicated previously, distal end 36 has a flat slanted end and distal end 38 has a radially-shaped or V-shaped surface or other equivalent shapes. See FIGS. 4 and 5. It has been found that this arrangement is preferred because if both are flat, ball 40 and plunger 46 are allowed to float, producing inaccurate measurements. Therefore, in the preferred embodiment, at least one surface is either V-notched or radially-shaped along the slanted surface to entrap the ball so that its lateral and reciprocal movement is controlled. Distal end 36 purposely remains flat because it is easier to align transfer arms 21 with contact 40. If both were either radially-shaped or V-notched, alignment would be difficult and inaccurate readings could result.

Figure 6:
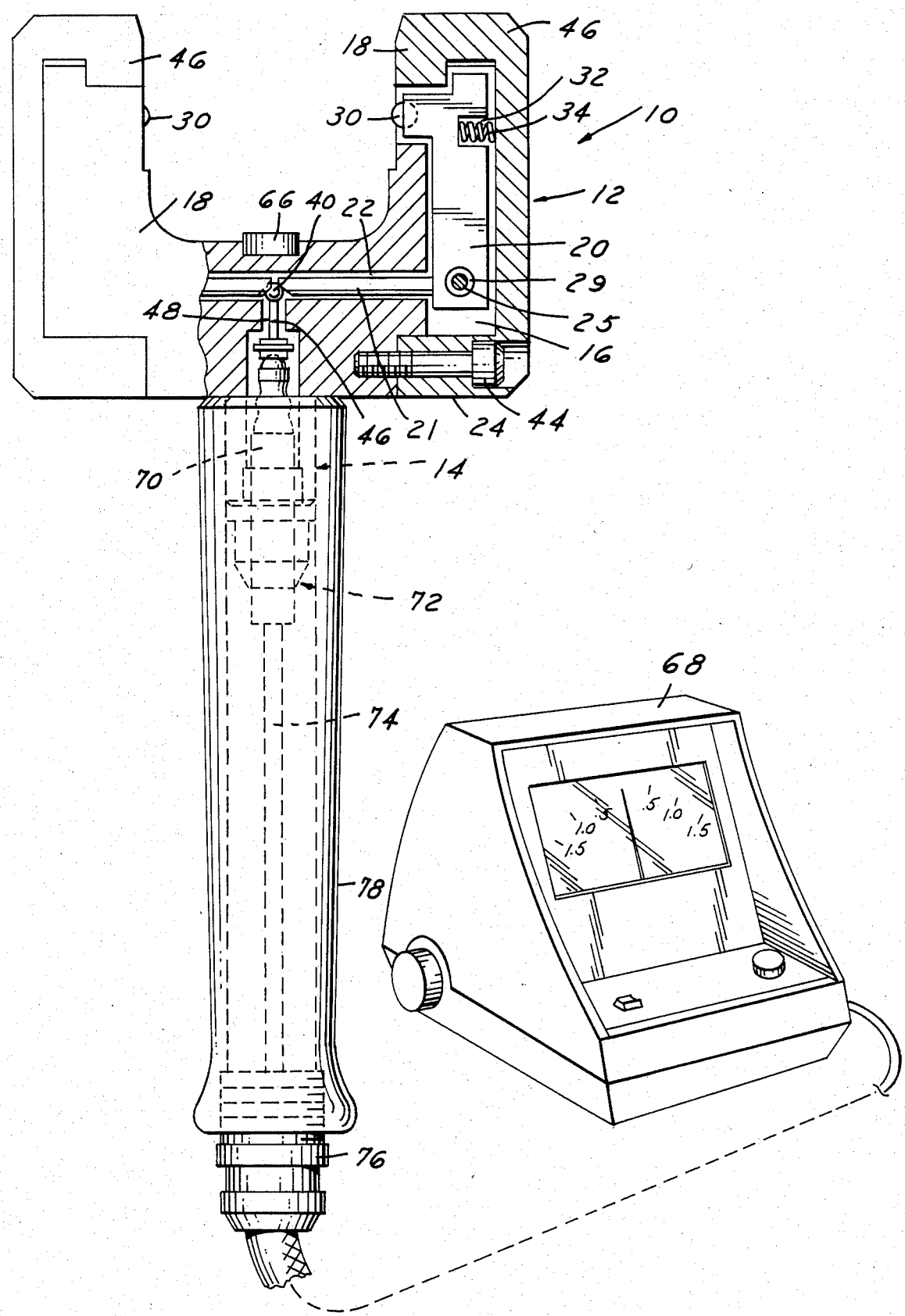
FIG. 6 is a partially cutaway plan view of a further embodiment of the present invention.

Referring now to FIG. 6, a second embodiment of the present invention is indicated wherein like elements are indicated with like numerals. In this embodiment, snap gage 10 is removably attached to a digital display 68. A LVDT or linear variable differential transformer 70 is used to detect linear movement of plunger 46. It will be recalled that in the prior embodiment, linear movement of plunger 40 was detected by a gaging spindle 54. In this embodiment, pivotal movement of sensing arms 20 is transferred by transfer arms 21 to contact ball 40 which reciprocates plunger 46 whose linear movement is detected by the LVDT 70 which translates the mechanical linear movement into an electrical signal which is indicated on digital display 68. LVDT 70 biases plunger 46 against arms 21.

In the preferred embodiment, a coupling unit 72 connects LVDT cable 74 with LVDT 70. To protect the cable and the LVDT and to form an extended handle, a second coupling unit 76 is mounted on cable 74 a spaced distance from unit 72 and a hollow sleeve 78 is slidably mounted between unit 76 and base 24. The sleeve is made of brass, bronze, nylon, plastic, or similar durable materials.

The operation of the second embodiment, other than the display and LVDT 70, is identical to the first embodiment.

It will be apparent to those skilled in the art that the foregoing disclosure is explanatory in nature rather than limiting, the invention being limited only by the appended claims.

What is claimed is:

1. A gaging means for use in determining the external dimensions of a member, said gaging means comprising:
   a housing having an opening therein for receipt of a part to be gaged;
   opposed individual levers pivotally mounted on separate pivots within said housing, each of said levers having a sensing arm operatively positioned adjacent said opening and a transfer arm extending outwardly from and perpendicular to said sensing arm, said transfer arms having adjacent distal ends;
   a linear translating member movably positioned within said housing having one end adjacent said distal ends of said transfer arms with the opposite end operatively connected to said indicator means;
   whereby insertion of a part within said opening pivots said levers, with the pivotal movement being transferred by said transfer arms to said linear translating member and thereafter indicated by said indicator means;
   a plunger having a substantially spherical member forming a contact point at one end continuously engaging said distal ends as said distal ends pivot in response to pivotal movement of said levers and a seat at said opposite end continuously contacting said indicator means;
   said contact point and seat being configured to allow said plunger to simultaneously reciprocate and oscillate within said housing ensuring continued contact and tracking between said plunger and said distal end;
   whereby said indicator means receives the cumulative movement of said levers ensuring accurate measurements irrespective of the position of said part;
   said pivots being located on parallel axes which occupy the same plane; said plane extending through said spherical member.

2. The gaging means of claim 1, wherein said distal ends are chamfered, sloping downwardly away from said contact point;
   one of said chamfered ends being substantially flat resulting in line contact with said spherical member, with said other chamfered end being longitudinally configured to provide greater than line contact.

3. The gaging means of claim 1, wherein said levers are independently biased inwardly into said opening, providing continuous contact with said part irrespective of said part's alignment within said opening.

4. An improved snap gage for use in measuring the external dimensions of a member for determining the amount of deviation from a standard dimension, said snap gage comprising:
   a substantially U-shaped housing portion having first and second upright legs interconnected by a base, said legs and base forming an opening for receipt of said member and a handle portion joined to said housing portion;

said legs having an inner and an outer surface, each of said outer surfaces having a longitudinal slot formed therein;

a first bore extending within said base interconnecting said slots and a second bore extending within said handle perpendicular to and communicating with said first bore;

first and second levers pivotally mounted on pivots within said slots, said pivots having parallel axes; said levers each having a sensing arm extending along the length of said slot operatively communicating with said opening and a perpendicular transfer arm extending within said first bore, said transfer arms having distal ends positioned adjacent said second bore;

a linear translating means movably positioned within said second bore having a first end operatively contacting said distal ends of said transfer arms and a second end operatively contacting a movement indicator means;

whereby upon insertion of said member into said opening, said sensing arms are contacted pivoting said levers, said pivotal movement being detected by said linear translating means through said transfer arms, said detected movement moving said translating means wherein said indicator receives the cumulative pivotal movement of said levers as a single linear response;

said pivot axes being located in a plane which extends through said first end of said linear translating means and said distal end of said transfer arms.

5. The improved snap gage of claim 4, wherein said distal ends are chamfered downwardly and away from said second bore;

one of said chamfered distal ends having a flat surface and the other of said chamfered distal ends having a non-flat surface.

6. The improved snap gage of claim 4, wherein said linear translating means includes a plunger having a first contact at one end operatively contacting said distal ends and a second contact at the opposite end operatively contacting said indicator means;

said contact being configured to permit said plunger to reciprocate and oscillate within said second bore in response to movement of said transfer arms.

7. The improved snap gage of claim 6, wherein said first contact comprises a substantially spherical member and said second contact comprises a collar having a conical seat therein.

8. The improved snap gage of claim 4, further comprising biasing means positioned behind each of said sensing levers biasing said levers into said opening, therein maintaining continual contact between said levers and said part.

* * * * *